United States Patent
García Morato Fernández Baillo et al.

(10) Patent No.: US 9,508,120 B2
(45) Date of Patent: Nov. 29, 2016

(54) SYSTEM AND METHOD FOR COMPUTER VISION ITEM RECOGNITION AND TARGET TRACKING

(71) Applicant: AUGMENTED REALITY LAB LLC, Coral Gables, FL (US)

(72) Inventors: Pablo García Morato Fernández Baillo, Madrid (ES); Frida Issa, Madrid (ES)

(73) Assignee: AUGMENTED REALITY LAB LLC, Coral Gables, FL (US)

(*) Notice: Subject to any disclaimer, the term of this patent is extended or adjusted under 35 U.S.C. 154(b) by 0 days.

(21) Appl. No.: 13/936,663

(22) Filed: Jul. 8, 2013

(65) Prior Publication Data
US 2015/0010242 A1    Jan. 8, 2015

(51) Int. Cl.
G06T 3/40 (2006.01)
G06K 9/46 (2006.01)
G06K 9/03 (2006.01)
G06K 9/00 (2006.01)

(52) U.S. Cl.
CPC ............ G06T 3/40 (2013.01); G06K 9/00201 (2013.01); G06K 9/03 (2013.01); G06K 9/4661 (2013.01)

(58) Field of Classification Search
None
See application file for complete search history.

(56) References Cited

U.S. PATENT DOCUMENTS

| | | | | |
|---|---|---|---|---|
| 6,975,755 B1 * | 12/2005 | Baumberg | ........... | G06K 9/4642 345/419 |
| 8,411,089 B2 * | 4/2013 | Ford | ................................... | 3/52 |
| 2003/0063793 A1 * | 4/2003 | Thornber | ............. | G06K 9/4661 382/154 |
| 2006/0023923 A1 * | 2/2006 | Geng | ...................... | G06T 19/20 382/116 |
| 2006/0039600 A1 * | 2/2006 | Solem | ................ | G06K 9/00281 382/154 |
| 2011/0002531 A1 * | 1/2011 | Heisele | ............. | G06K 9/00208 382/154 |
| 2011/0012901 A1 * | 1/2011 | Kaplanyan | ............ | G06T 15/506 345/426 |
| 2011/0286628 A1 * | 11/2011 | Goncalves | ........ | G06F 17/30256 382/103 |

FOREIGN PATENT DOCUMENTS

NL          EP 2560145 A2 *  2/2013  ........... G06T 19/006

OTHER PUBLICATIONS

International search report dated Sep. 11, 2014 issued in corresponding PCT application PCT/US2014/033372.
International Preliminary Report on Patentability dated Jan. 12, 2016 for counterpart PCT application PCT/US2014/033372.
Written Opinion of the International Searching Authority dated Sep. 11, 2014 for counterpart PCT application PCT/US2014/033372.

* cited by examiner

*Primary Examiner* — Matthew Bella
*Assistant Examiner* — Soo Shin
(74) *Attorney, Agent, or Firm* — Norton Rose Fulbright US LLP

(57) ABSTRACT

A system for recognizing objects under different environmental conditions by manipulating an original image with light and animation effects in real time and comparing the result with an input frame. This improves the ability of the system to detect and recognize a matching real world object in a variety of conditions. 3D rendering techniques are used to create a new and more accurate reference model as compared to current static object descriptions. The system is implemented on a computer with GPU capabilities. The real world object to be recognized is configured in the system as a 3D object, and is manipulated to create custom environmental conditions that can be adjusted by the user to optimize detection and recognition in an environment appropriate for each user.

3 Claims, 3 Drawing Sheets

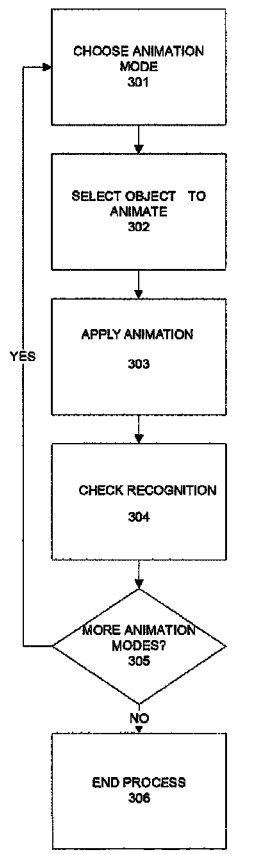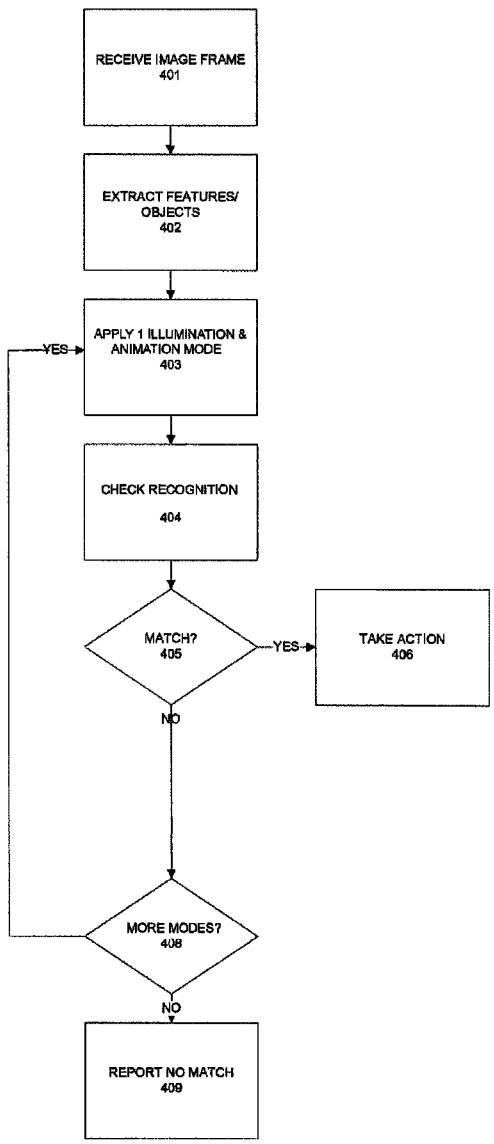

SYSTEM AND METHOD FOR COMPUTER VISION ITEM RECOGNITION AND TARGET TRACKING

BACKGROUND

One of the most difficult tasks in machine vision is recognition of objects within a scene (i.e. in an image frame captured by an image acquisition device). A human can recognize such an object quite easily in a variety of environmental conditions, even when the object is partially obscured, has variations or imperfections, or is in front of or behind other objects, and from different perspective and scales, and in lighting and other conditions that are difficult for machines to emulate.

In order to determine if a particular object is present in a scene, the system must be able to distinguish objects within the image. A human can easily and naturally perform this task in both 2D and 3D images of scenes. For a single camera machine vision system, however, the data arrives as a 2D image and individual objects are not identified. The machine vision system may use a number of known techniques to identify an object, such as edge detection, feature extraction and the like.

Once an object is detected in the image, it must then be recognized. A typical machine system compares a detected object to a reference model stored in a database. If the object is rotated or skewed, or is viewed from a different perspective, object rotation and positioning algorithms may be applied to normalize the detected object for recognition. The detected object may also be scaled up or down to improve the chances of matching a reference model of the object.

Current systems do not perform well in varying lighting and environmental conditions. The changing of incident light angles, reduced brightness or very bright lighting, and the like, affect the ability of the system to even extract features or edges of an object to allow for object recognition. In current systems, object detection and recognition are linked problems that have meaningful impact on each other. Poor object detection leads to a reduced likelihood of accurate object recognition. Furthermore, when the case includes a database of multiple reference images of multiple objects, recognition becomes harder and confusion may occur. An object under some light conditions and animation transformation may suddenly look like another object in the database and lead to a false match.

This problem can be made worse depending on the object to be recognized. Simple, planar, geometrical objects are easier to recognize, but limit the system to such objects. A non-planar object is more sensitive to light than a planar object as its curves create a shadow over the object itself. When the scene has more than one light and/or non-homogenic light this problem becomes even worse. The information that the recognition or tracking system is looking for may change or even disappear from the scene. Current systems try to solve the problem of lighting variation by extra processing methods to the original image, such as smoothing the image, blurring its features, working in gray scale, manipulating the color density of the image so it will better represent the object in real situations, etc. However, these solutions are problematic as they rely on the assumption that the effect of the light over the object is homogeneous. That is, the distribution of light over the whole surface of the object is mistakenly assumed to be exactly the same. Furthermore, those assumptions cannot deal with different light sources from different angles.

SUMMARY

The present invention provides a solution for recognizing objects in real scenes. A 3D rendering system is used to recognize the object. In particular, a 3D rendering engine creates a simulation of the scene by setting a specific object being looked for into a 3D scene and applying a combination of illumination and animation to find it.

The object model can be an image, a box, a bottle, a face, a whole human body or any random 3D model. The system takes the 3D presentation of the model and prepares it for recognition.

The system takes input frames from the device that is used to recognize the object. For each frame, a combination of illumination and animation is applied and the resulting texture is looked for in the scene by a feature extraction recognition algorithm. The recognition gets a score of quality. If the result is above a threshold the object is considered detected under specific illumination and in a specific animated position.

These and further embodiments will be apparent from the detailed description and examples that follow.

BRIEF DESCRIPTION OF THE DRAWINGS

FIG. 3 is a flow diagram illustrating animation transformation in one embodiment of the invention.

FIG. 4 is a flow diagram illustrating object recognition in one embodiment of the invention.

DETAILED DESCRIPTION

The present system renders a 3D model of an object that is to be recognized in a machine vision system. For each frame, to recognize the object, a rendering process is applied with specific light and animation influence to recognize the object under specific conditions.

Figure 1:
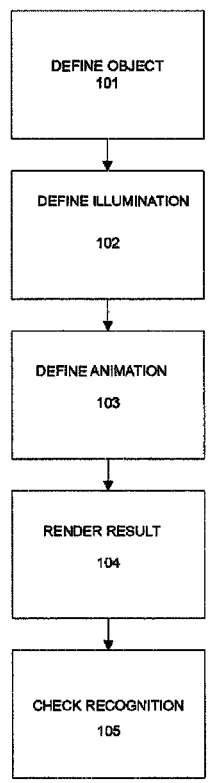
FIG. 1 is a flow diagram illustrating operation of one embodiment of the invention.

FIG. 1 is a flow diagram illustrating operation of one embodiment of the invention. At step 101 an object is defined for recognition. The object is a real world object that the system desires to recognize, such as a face, car, cube, cylinder, sphere, or any other object. In some applications, an animate object such as a human may be the object to recognize. In other instances, it may be desired to recognize inanimate objects such as parts in a factory, manufactured items, and the like.

At step 102, an illumination type and position is defined. The illumination type may vary between point, directional, spotlight, and other types, and the position of the light determines its intensity and effect over the model. Illumination is particularly important in non planar objects that are sensitive to light effect. The illumination may be from multiple lights and a combination of existing lights in the scene. Feedback input from the real scene may be used to simulate the right kind of light.

At step 103 the user defines the animation. The animation describes the model position and rotation. The animation may scale the object up or down according to its distance. The rotation of the object may be along any axis.

After defining the light and animation conditions in steps 102 and 103, the system renders the scene and applies light and animation effects at step 104 for each and every reference object in the database. The Base Reference Model texture becomes brighter or with more shadow effect according to the light position and type, and the object is smaller or bigger and rotated in different angles.

At this point, a result is rendered in the form of a screenshot of the object in specific environmental conditions for every single reference object in the database. This result is taken and compared against an input frame in step 105 to check if the object is detected in the input frame. Recognition is done against modified textures to make the same influence over all the subjects, and if some conditions are assumed then they are applied to all in order to prevent false matches.

Figure 2:
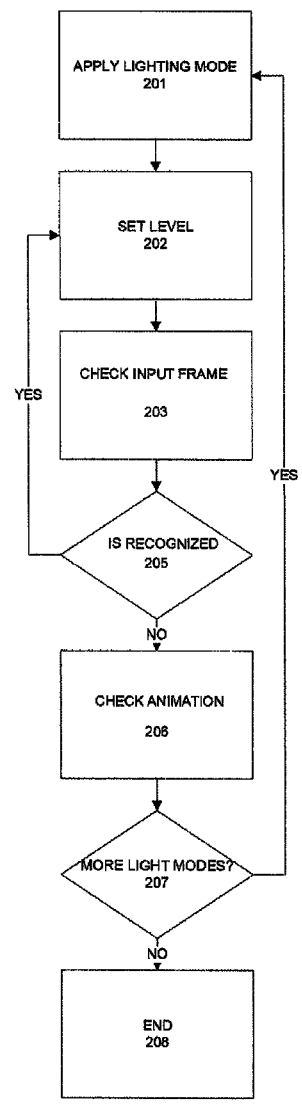
FIG. 2 is a flow diagram illustrating lighting influence in one embodiment of the invention.

FIG. 2 is a flow diagram illustrating lighting influence in one embodiment of the invention. At step 201 the system applies a lighting mode to the scene. There are a plurality of lighting modes that the system can replicate to accommodate many possible real world conditions. Some of the lighting modes that can be used with the system are described below.

Ambient Lighting

An ambient light source represents a fixed-intensity and fixed-color light source that affects all objects in a scene equally. Upon rendering, all objects in the scene are brightened with the specified intensity and color. This light represents a uniform light of equal intensity over the whole surface of the Base Reference Model. This light brightens or darkens the model in a uniform influence. The user can define a plurality of levels of brightness and darkness with which to influence the scene in the system. For each level of brightness or darkness, the system can also assign one of a plurality of colors to the ambient light, representing expected and possible ambient conditions.

Directional Lighting

A directional light source illuminates all objects equally from a given direction, like an area light of infinite size and infinite distance from the scene, this light effect is also uniform over the whole object surface. Only objects standing in the direction of the light are affected by this kind of light and shadows are created as a result.

Point Lighting

Point lighting originates from a single point, and spreads outward in all directions. Point lighting emanates in all directions and not only towards one part of the scene, and creates shadows over the surface of the object.

Spotlight Lighting

A spotlight originates from a single point, and spreads outward in a cone of light growing wider in area and weaker in influence as the distance from the object grows. The system can illustrate real time conditions using a plurality of spotlight locations with each location having a plurality of intensity levels as desired.

Area Lighting

Area lighting originates from a single plane and illuminates all objects in a given direction beginning from that plane. The direction may be moved about as desired and different levels and colors may be assigned to the area light as well.

Volumetric Lighting

Volume light lights objects within an enclosed space. As with the other lighting modes, volumetric light may be positioned in a plurality of locations with a plurality of intensities and colors.

Combined Sources

Different lighting modes can be combined in a transformation scene, especially if it may happen in the corresponding real world application. The system's rendering engine interpolates how these lights should be combined, and produces a 2D image of each combination to be displayed on the screen accordingly.

At step 202 the system sets the level for the current light source or combination of light sources, along with any intensity and/or color parameters defined by the user. At step 203 the system renders the image with the lighting effect and compares it with an input frame. Features extraction is applied to the light affected object instead of the natural original image. This image includes all appropriate shading and color variations, blurring, and any other effects that would result from the lighting types, locations, intensities, and colors.

At decision block 205 it is determined whether the object is recognized in the input frame. If so, the system returns to step 202. If not, the system proceeds to step 206.

At step 206 the system applies one animation associated with the lighting mode and checks for recognition within the check animation process. Later it proceeds to decision block 207. At decision block 207 it is determined if there are any more lighting modes with which to modify the scene rendered in the system. If so, the system returns to step 201 and applies the next lighting mode. If not, the system ends at step 208.

Animation

FIG. 3 is a flow diagram illustrating animation influence in one embodiment of the invention. Here, the user chooses one or more animation modes. The types of animation provided by the system include rotation, translation and scaling of the object in the scene. At this point, the objects in the scene include the 3D model for recognition, plus the lights added to the scene. Feedback input can be given to the system such as sensor information from a sequence following frame changes.

At step 302, the user selects the scene objects to animate. The system allows the user to associate animations with any object in the scene, therefore it allows the user to create a scene that covers possible situations in the real world. The user can make the sample model rotate, thereby changing the light effect over the surface. It can translate or scale the object so as to define the object in different sizes and positions. The system also allows the camera or lights to turn around or move to different positions. Any animation mode can be combined with any of the lighting modes of FIG. 2.

At step 303 the user runs the animation and captures a snapshot of the affected texture to be used as input for the recognition process in step 304. At decision block 305, the system determines if there are more animation modes to implement. If so, the system returns to step 301 and chooses the next animation mode. If not, the process ends at step 306.

Object Recognition

FIG. 4 is a flow diagram illustrating object recognition in one embodiment of the invention. At step 401 the system receives an image frame from an image capture device such as a camera. At step 402 the system applies extraction techniques to identify features or objects in the image frame. At block 403 the system applies one mode of illumination and one mode of animation as a combined situation. At step 404 the system compares extracted features from the processed image with the input frame. At decision block 405 it is determined if there is a match within a threshold range. If so, the system reports object recognition and takes whatever action is appropriate when a match is found at step 406. This may include tracking the recognized object, alerting a user, or undertaking some other action.

If there is no match at block 405 the system determines in block 408 whether there are more modes of light and animation to apply to the original image. If so, the system returns to step 403. If not, the system reports no match at step 409.

Embodiment of a Computer Execution Environment (Hardware)

Figure 5:
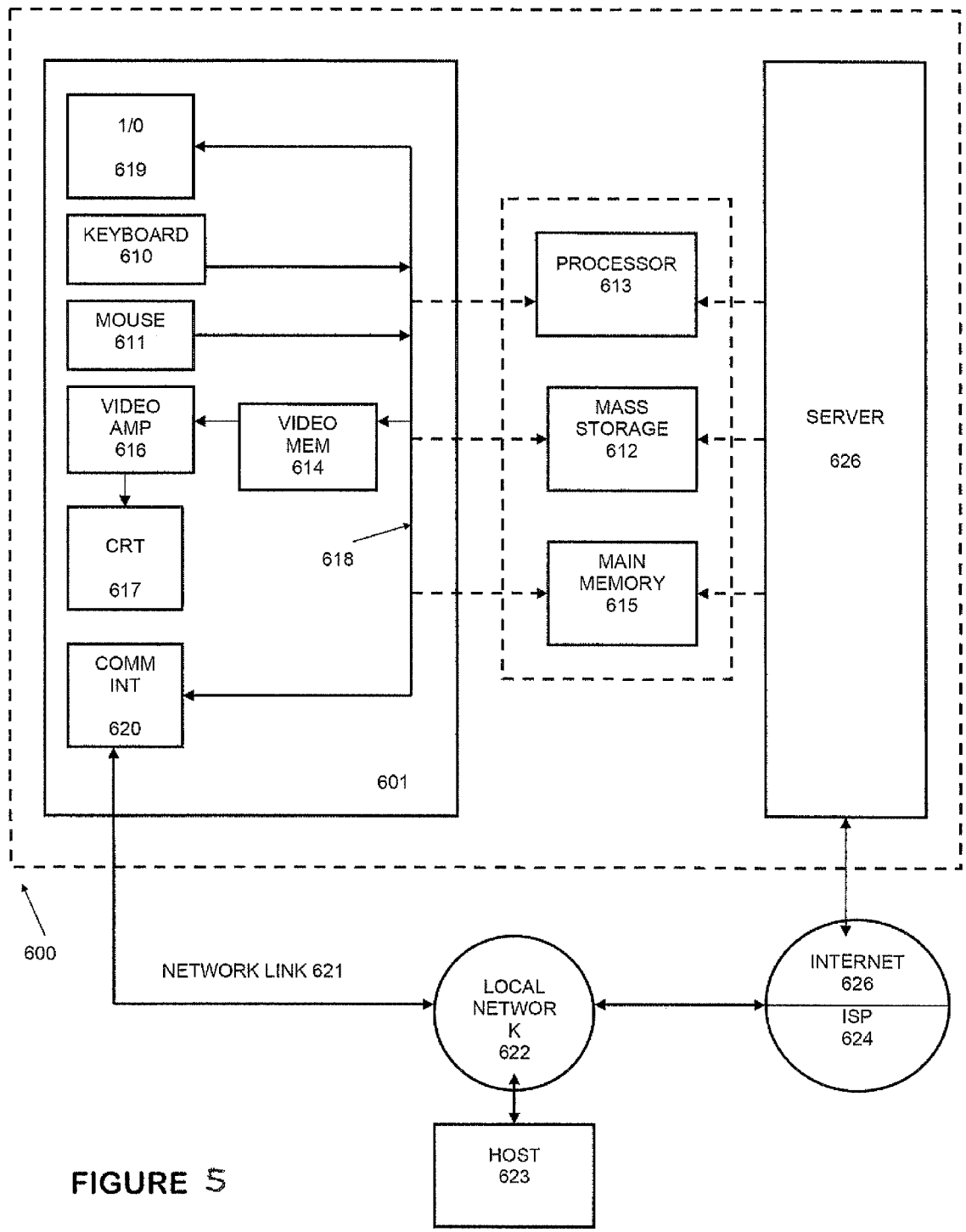
FIG. 5 is a diagram of a computer execution environment according to one embodiment of the invention.

The system can be implemented as computer software in the form of computer readable program code executed in a general purpose computing environment such as environment 600 illustrated in FIG. 5, or in the form of bytecode class files executable within a JAVA (trademark) run time environment running in such an environment, or in the form of bytecodes running on a processor (or devices enabled to process bytecodes) existing in a distributed environment (e.g., one or more processors on a network). A keyboard 610 and mouse 611 are coupled to a system bus 618. The keyboard and mouse are for introducing user input to the computer system and communicating that user input to central processing unit (CPU 613. Other suitable input devices may be used in addition to, or in place of, the mouse 611 and keyboard 610. I/O (input/output) unit 619 coupled to bi-directional system bus 618 represents such I/O elements as a printer, A/V (audio/video) I/O, etc.

Computer 601 may be a laptop, desktop, tablet, smartphone, or other processing device and may include a communication interface 620 coupled to bus 618. Communication interface 620 provides a two-way data communication coupling via a network link 621 to a local network 622. For example, if communication interface 620 is an integrated services digital network (ISDN) card or a modem, communication interface 620 provides a data communication connection to the corresponding type of telephone line, which comprises part of network link 621. If communication interface 620 is a local area network (LAN) card, communication interface 620 provides a data communication connection via network link 621 to a compatible LAN. Wireless links are also possible. In any such implementation, communication interface 620 sends and receives electrical, electromagnetic or optical signals which carry digital data streams representing various types of information.

Network link 621 typically provides data communication through one or more networks to other data devices. For example, network link 621 may provide a connection through local network 622 to local server computer 623 or to data equipment operated by ISP 624. ISP 624 in turn provides data communication services through the world wide packet data communication network commonly referred to as the Internet 626 Local network 622 and Internet 626 both use electrical, electromagnetic or optical signals which carry digital data streams. The signals through the various networks and the signals on network link 621 and through communication interface 620, which carry the digital data to and from computer 600, are exemplary forms of carrier waves transporting the information.

Processor 613 may reside wholly on client computer 601 or wholly on server 626 or processor 613 may have its computational power distributed between computer 601 and server 626. Server 626 symbolically is represented in FIG. 5 as one unit, but server 626 can also be distributed between multiple tiers. In one embodiment, server 626 comprises a middle and back tier where application logic executes in the middle tier and persistent data is obtained in the back tier. In the case where processor 613 resides wholly on server 626, the results of the computations performed by processor 613 are transmitted to computer 601 via Internet 626, Internet Service Provider (ISP) 624, local network 622 and communication interface 620. In this way, computer 601 is able to display the results of the computation to a user in the form of output.

Computer 601 includes video memory 614, main memory 615 and mass storage 612, all coupled to bi-directional system bus 618 along with keyboard 610, mouse 611 and processor 613.

As with processor 613, in various computing environments, main memory 615 and mass storage 612, can reside wholly on server 626 or computer 601, or they may be distributed between the two. Examples of systems where processor 613, main memory 615, and mass storage 612 are distributed between computer 601 and server 626 include thin-client computing architectures and other personal digital assistants, Internet ready cellular phones and other Internet computing devices, and in platform independent computing environments.

Mass storage 612 may include both fixed and removable media, such as magnetic, optical or magnetic optical storage systems or any other available mass storage technology. The mass storage may be implemented as a RAID array or any other suitable storage means. Bus 618 may contain, for example, thirty-two address lines for addressing video memory 614 or main memory 615. System bus 618 also includes, for example, a 32-bit data bus for transferring data between and among the components, such as processor 613, main memory 615, video memory 614 and mass storage 612. Alternatively, multiplex data/address lines may be used instead of separate data and address lines.

In one embodiment of the invention, processor 613 is a microprocessor such as one manufactured by Intel, AMD, Sun, etc. However, any other suitable microprocessor or microcomputer may be utilized, including a cloud computing solution. Main memory 615 is comprised of dynamic random access memory (DRAM). Video memory 614 is a dual-ported video random access memory. One port of video memory 614 is coupled to video amplifier 616. Video amplifier 616 is used to drive cathode ray tube (CRT) raster monitor 617. Video amplifier 616 is well known in the art and may be implemented by any suitable apparatus. This circuitry converts pixel data stored in video memory 614 to a raster signal suitable for use by monitor 617. Monitor 617 is a type of monitor suitable for displaying graphic images.

Computer 601 can send messages and receive data, including program code, through the network(s), network link 621, and communication interface 620. In the Internet example, remote server computer 626 might transmit a requested code for an application program through Internet 626, ISP 624, local network 622 and communication interface 620. The received code maybe executed by processor 613 as it is received, and/or stored in mass storage 612, or other non-volatile storage for later execution. The storage may be local or cloud storage. In this manner, computer 600 may obtain application code in the form of a carrier wave. Alternatively, remote server computer 626 may execute applications using processor 613, and may utilize mass storage 612, and/or video memory 615. The results of the execution at server 626 are then transmitted through Internet 626, ISP 624, local network 622 and communication interface 620. In this example, computer 601 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. In other embodiments, the system may be implemented on any suitable computing environment including personal computing devices, smart-phones, pad computers, and the like. An embodiment of the invention may be implemented in any type of computer system or programming or processing environment.

While the system has been described with respect to a limited number of embodiments, it will be appreciated that many variations, modifications, and other applications of the system may be made.

What is claimed is:

1. A method for recognizing an object embodied in a computer-readable medium and executed by a processor, comprising:
   rendering a scene by applying a combination of one of a plurality of illumination modes and one of a plurality of animation modes to the object;
   comparing the rendered scene to an input frame to determine whether the object is recognized in the input frame;
   if the object is recognized in the input frame, reporting object recognition;
   if the object is not recognized in the input frame, determining whether there is a different combination of illumination and animation modes that has not yet been applied to the object; and
      if there is a different combination, repeating the method by rendering another scene using the different combination and comparing the input frame to the another scene;
      if there is not a different combination reporting no object recognition.

2. The method of claim 1, wherein the plurality of illumination modes comprise ambient lighting, directional lighting, point lighting, spotlight lighting, area lighting and volumetric lighting.

3. The method of claim 1, wherein the plurality of animation modes comprise rotating the object, translating the object and scaling the object.

* * * * *